United States Patent
Weiss

(10) Patent No.: US 10,343,514 B2
(45) Date of Patent: Jul. 9, 2019

(54) VEHICLE REAR OF A MOTOR VEHICLE

(71) Applicant: Dr. Ing. h.c. F. Porsche Aktiengesellschaft, Stuttgart (DE)

(72) Inventor: Thomas Weiss, Tamm (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/967,992

(22) Filed: May 1, 2018

(65) Prior Publication Data
US 2018/0326836 A1 Nov. 15, 2018

(30) Foreign Application Priority Data
May 9, 2017 (DE) ........................ 10 2017 109 887

(51) Int. Cl.
| | | |
|---|---|---|
| *B60K 13/04* | (2006.01) | |
| *B60R 13/04* | (2006.01) | |
| *B60R 13/08* | (2006.01) | |
| *B60R 19/02* | (2006.01) | |
| *B60R 19/48* | (2006.01) | |
| *B60R 19/18* | (2006.01) | |

(52) U.S. Cl.
CPC .............. *B60K 13/04* (2013.01); *B60R 13/04* (2013.01); *B60R 13/0876* (2013.01); *B60R 19/023* (2013.01); *B60R 19/48* (2013.01); *B60R 2019/1886* (2013.01)

(58) Field of Classification Search
CPC ......... B60K 13/04; B60R 19/48; B60R 13/04; B60R 13/0876; B60R 19/023; B60R 2019/1886
See application file for complete search history.

(56) References Cited

U.S. PATENT DOCUMENTS 2,568,409 A * 9/1951 Phillips .................. B60R 19/48
  180/89.2
2,841,232 A * 7/1958 Loeffler ................ B60K 13/04
  180/89.2

(Continued)

FOREIGN PATENT DOCUMENTS

DE    10 2004 019    11/2005
DE    10 2009 034 761    2/2010

(Continued)

OTHER PUBLICATIONS

German Search Report dated Feb. 23, 2018.
Norm 49 CFR 581 Oct. 1, 2011, Bumper Standard, S. 289-293.

*Primary Examiner* — Jacob B Meyer
(74) *Attorney, Agent, or Firm* — Gerald E. Hespos; Michael J. Porco; Matthew T. Hespos

(57) ABSTRACT

A rear (1) of a motor vehicle has a bumper (2) configured as a beam and arranged in a transverse direction (Y) of the motor vehicle. A trim panel (3) covers the bumper (2), and an end plate (4) is provided for at least one end pipe (5) of an exhaust gas system of the motor vehicle. An opening (7) penetrates the trim panel (3) below the bumper (2), and the end plate (4) penetrates the opening (7). Supports (8) are connected to the bumper (2) behind the trim panel (3) and extend down from the bumper (2). The trim panel (3) is mounted in the supports (8) below the bumper (2), and the end plate (4) is mounted in the trim panel (3).

15 Claims, 1 Drawing Sheet

(56) References Cited

U.S. PATENT DOCUMENTS

| | | | |
|---|---|---|---|
| 2,850,314 A * | 9/1958 | Haigh | B60R 19/48 181/211 |
| 2,854,278 A * | 9/1958 | Zerhan, Jr. | B60K 13/06 285/49 |
| 2,856,020 A * | 10/1958 | Hoagg | B60K 13/06 180/309 |
| 2,902,102 A * | 9/1959 | Gorman | B60K 13/06 180/309 |
| 2,979,357 A * | 4/1961 | Leach | B60R 19/48 180/89.2 |
| 2,992,035 A * | 7/1961 | Tell | B60R 19/48 180/89.2 |
| 5,321,214 A * | 6/1994 | Uegane | B60K 13/04 181/211 |
| 6,962,230 B2 * | 11/2005 | Hanaya | B60K 13/04 180/309 |
| 7,007,720 B1 * | 3/2006 | Chase | F16L 59/12 138/110 |
| 7,458,440 B2 * | 12/2008 | Uegane | F01N 13/08 181/209 |
| 7,686,131 B1 * | 3/2010 | Osterkamp | F01N 13/001 180/89.2 |
| 7,735,885 B2 * | 6/2010 | Shin | B60K 13/04 293/113 |
| 7,823,938 B2 * | 11/2010 | McKee | B60K 13/02 293/102 |
| 7,976,081 B2 * | 7/2011 | McKee | B60K 13/02 293/102 |
| 8,671,575 B2 * | 3/2014 | Yoo | B60K 13/04 29/897.2 |
| 8,863,886 B2 * | 10/2014 | O'Brien | B60R 13/0876 138/110 |
| 9,145,819 B2 * | 9/2015 | O'Brien | F01N 13/10 |
| 9,157,556 B2 * | 10/2015 | Quinlan | F01N 13/082 |
| 9,322,318 B2 * | 4/2016 | O'Brien | B60R 13/0876 |
| 9,328,648 B2 * | 5/2016 | Nowka | F01N 13/20 |
| 9,328,649 B2 * | 5/2016 | Kieslich | F01N 13/082 |
| 9,346,350 B2 * | 5/2016 | Nowka | B60K 13/04 |
| 9,370,997 B2 * | 6/2016 | Yoo | B60K 13/04 |
| 9,536,040 B2 * | 1/2017 | Zhang | G06F 17/5095 |
| 9,982,579 B2 * | 5/2018 | Socha | F01M 5/002 |
| 2008/0036222 A1 * | 2/2008 | Iwamoto | F01N 13/082 293/113 |
| 2009/0236868 A1 * | 9/2009 | Shin | B60K 13/04 296/1.08 |
| 2009/0265934 A1 * | 10/2009 | Lee | B60K 13/04 29/890.08 |
| 2010/0096865 A1 * | 4/2010 | McKee | B60K 13/02 293/113 |
| 2011/0080011 A1 * | 4/2011 | McKee | B60K 13/02 293/117 |
| 2012/0201989 A1 * | 8/2012 | Minato | B29C 45/0053 428/36.92 |
| 2013/0026749 A1 * | 1/2013 | O'Brien | B60R 13/0876 285/62 |
| 2014/0360801 A1 * | 12/2014 | O'Brien | B60R 13/0876 180/309 |
| 2015/0198078 A1 * | 7/2015 | O'Brien | F01N 13/10 180/309 |
| 2018/0326836 A1 * | 11/2018 | Weiss | B60K 13/04 |

FOREIGN PATENT DOCUMENTS

| | | |
|---|---|---|
| EP | 1 243 477 | 9/2002 |
| JP | 2007-327457 | 12/2007 |

\* cited by examiner

VEHICLE REAR OF A MOTOR VEHICLE

CROSS REFERENCE TO RELATED APPLICATION

This application claims priority under 35 USC 119 to German Patent Appl. No. 10 2017 109 887.9 filed on May 9, 2017, the entire disclosure of which is incorporated herein by reference.

BACKGROUND

Field of the Invention. The invention relates to a vehicle rear of a motor vehicle, having a bumper that is configured as a beam and is arranged in a transverse direction of the motor vehicle. A trim panel covers the bumper and an end plate for at least one end pipe of an exhaust gas system of the motor vehicle. An opening penetrates the trim panel below the bumper, and the end plate penetrates the opening.

Description of the Related Art. Motor vehicles having at least one end pipe of an exhaust gas system mounted in an end plate are known. The end plate can also be used with two end pipes of the exhaust gas system arranged at a small spacing from one another. In this case, the end plate also is mounted in the end pipes. It is fundamentally disadvantageous that, with its additional weight, the end plate influences the exhaust gas system in the region of the at least one end pipe. This influence also is disadvantageous with respect to the vibration of the end pipe that is suspended in a sprung manner, or the arrangement of the end pipes that is arranged in a sprung manner.

DE 10 2009 034 761 A1 describes a bumper arranged in the rear region of a motor vehicle. The bumper is supported on the shell by a supporting element that is arranged on the shell of the motor vehicle.

DE 10 2004 019 149 A1 discloses a connecting element for fastening a multiple piece bumper unit that has an element to absorb impact energy.

EP 1 243 477 B1 describes a fastening apparatus of a trim panel on the shell. The trim panel covers a bumper in the front or rear region of the motor vehicle.

It is an object of the invention to develop a vehicle rear in such a way that the assembly of the motor vehicle can be simplified in its rear region.

SUMMARY

The terms "front, rear, top, bottom, left, right, lateral" relate to the orientation of the motor vehicle and the forward driving direction of the motor vehicle. Terms that relate to the trim panel, such as "behind the trim panel", refer to the viewing direction of a person looking at the trim panel in the installed position.

Supports that are connected to the bumper behind the trim panel extend down from the bumper. The trim panel is mounted in the supports below the bumper, and the end plate is mounted in the trim panel.

The invention does not require the end plate to be mounted in the at least one end pipe of the exhaust gas system. Rather, the end plate is mounted in the trim panel. Thus, the end plate is decoupled in terms of vibration with regard to the at least one end pipe and does not act with its weight on the end pipe. Instead, the trim panel holds the end plate and therefore its weight, and a particularly stable attachment of the trim panel on the bumper takes place via the supports.

The term "trim panel" is to be understood to be comprehensive and may describes a rear apron of the motor vehicle. The rear apron may be mounted in the shell, and may be fastened to the bumper.

The end plate may be mounted exclusively in the trim panel. Moreover, the at least one end pipe may penetrate the end plate in a contactless manner. When the trim panel is placed onto the bumper, the at least one end pipe of the exhaust gas system may be plugged through the end plate that is connected to the trim panel. It is therefore merely necessary to fasten the trim panel to the bumper and to establish the connection between the supports and the bumper. The supports already have been pre-mounted on the bumper and are connected in the region of their upper ends. The assembly complexity during the formation of the vehicle rear, in particular the attachment of the trim panel on the bumper, therefore is reduced considerably. Vibration-free mounting of the end plate in the trim panel ensures a permanent connection of the end plate and the trim panel.

Each of the opposite end regions of the bumper may have a support, and the trim panel may be connected to the bumper via these supports, and hence at a relatively great spacing from one another.

The support that is assigned to the opening in the trim panel may be adjacent to the opening. The mounting of the trim panel in the region of the one support in the bumper therefore takes place at a small spacing from the opening that penetrates the end plate. Weight forces that are introduced into the trim panel via the end plate therefore act on the trim panel only with a small lever arm, and can be introduced by a short path via the support into the bumper.

The end plate that is used with a sports car may be configured as a double pipe end plate. Thus, the end plate for a sports car has two pipes that form an end plate unit. Each pipe of the double pipe end plate is penetrated by an end pipe of the exhaust gas system of the motor vehicle when the trim panel is attached.

The end plate may be enclosed completely by the trim panel in an end plate plane. Thus, the opening in the trim panel is not open on one side (e.g. toward the bottom), but rather the trim panel encloses the end plate completely in the end plate plane.

The end plate may be mounted in the trim panel by fasteners to achieve a secure and permanent connection of the end plate and the trim panel. Additionally, the end plate may be mounted in the trim panel in upper and lower regions. The mounting therefore may be on sides of the end plate that face away from one another, and may be sufficiently stable, even in the case of vertical and lateral forces that act on the end plate during driving. The end plate may be mounted in the trim panel at the top by a single fastener and at the bottom by two fasteners. The support may have a Z-shaped profile transversely with respect to the support longitudinal direction. Thus, the support has an increased flexural stiffness and an increased torsional stiffness, with a relatively low weight of the support.

The mounting of the support in the bumper may be vertically adjustable to compensate for tolerances between the trim panel and the bumper. In this regard, the bumper typically has a square profile at least along part of its length. Thus, the support may have a U-shaped upper end with limbs of the support arranged on both sides of the bumper. Each limb on the support may be screwed in the region of a vertically arranged slot that penetrates the respective limb. Blind rivet threaded bolts may be connected to the support, which blind rivet threaded bolts penetrate slots in the two limbs. Nuts may be screwed onto the blind rivet threaded bolts to fix the limbs between the nuts and the bumper. This results in a particularly simple fastening of the support to the bumper with vertical adjustability of the support in the Z-direction.

The supports may have attachments on sides that face one another for supporting a foam part that is arranged between the attachments and the trim panel. The foam part between the trim panel and the bumper and between the trim panel and the supports contributes to the compliance with a legally required impact test at a low speed, for example the USA 49 CFR 581 impact test.

A heat shield may arranged with the supports, for shielding the heat of an exhaust gas system muffler that is arranged behind the trim panel. The supports therefore have the additional function of attaching a heat shield.

Further features of the invention arise from the appended drawings and the description of the exemplary embodiment without being restricted hereto.

DETAILED DESCRIPTION

Figure 1:
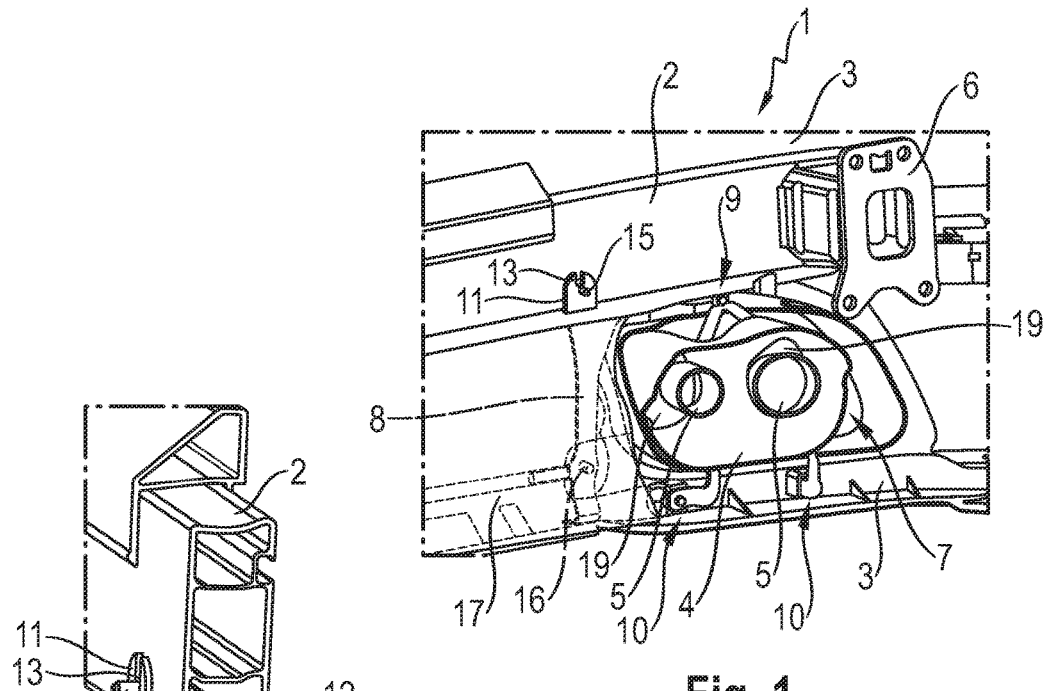
FIG. 1 shows a perspective view of a vehicle rear in an end region of a bumper, adjacently with respect to an end plate for two end pipes of an exhaust gas system, and a trim panel that covers the bumper in this region, as viewed in the direction of the rear side of the trim panel.
Figure 3:
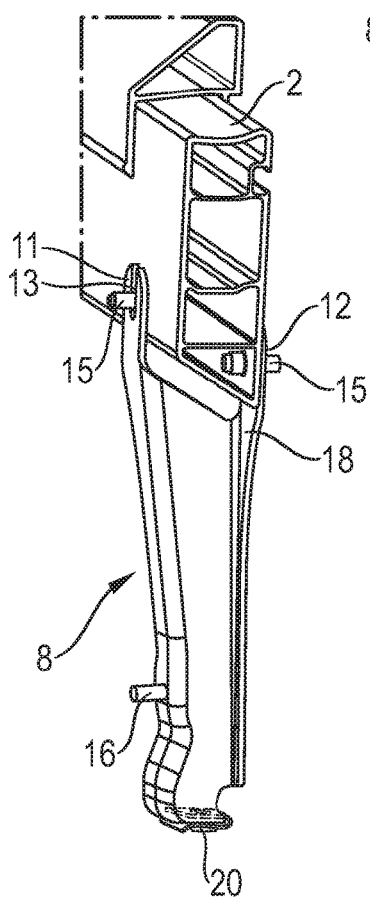
FIG. 3 is a perspective view of the bumper illustrated over a short part length, and showing the support that is connected to the bumper.
Figure 2:
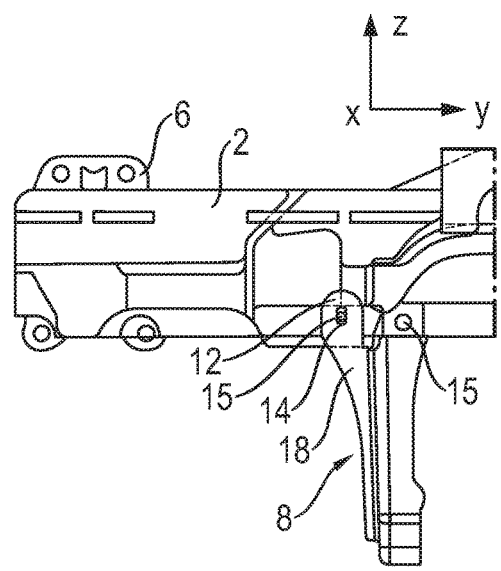
FIG. 2 is an elevational view in the forward driving direction X of the vehicle showing a side region of the bumper and a support that is connected to the bumper.

FIG. 1 illustrates a left region of a vehicle rear 1 of a passenger motor vehicle, for example, a sports car that has an internal combustion engine in the rear region.

As shown in FIG. 1, the rear 1 of the vehicle counter to the forward driving direction, includes: a bumper 2 configured as a beam extending in the Y-direction of the motor vehicle, which is the transverse direction of the motor vehicle, a trim panel 3 that covers the bumper 2; and an end plate 4 for two end pipes 5 of an exhaust gas system of the motor vehicle, with end pipes 5 illustrated only over a short length.

In the region of its left end (in relation to the forward driving direction X of the vehicle), the bumper 2 has metal has a flange hub 6, in the region of which the bumper 2 is screwed to the actual shell of the vehicle. Accordingly, the right end of the bumper 2 also has a flange hub of this type screwed to the shell.

The trim panel 3 consists of plastic and covers the region below a rear engine compartment cover. The trim panel 3 therefore is a rear apron that is fastened to the bumper.

An opening 7 penetrates the trim panel 3 below a left area of the bumper 2 and in a region of the left end of the bumper 2 adjacent to the respective flange hub 6. The end plate 4 penetrates the opening 7 and is enclosed completely by the trim panel 3. The end plate 4 is a double pipe end plate, and therefore has two circular openings 19. Each opening 19 is penetrated by an end pipe 5 of the exhaust gas system. However, the respective end pipe 5 does not contact the end plate 4 so that there is an annular gap between the end pipe 5 and the end plate 4.

Supports 8 are connected to the bumper 2 behind the trim panel 3 and extend downward from the bumper 2. Only the support 8 for the left end of the bumper 2 is shown, but a further support 8 is arranged in a correspondingly mirror-symmetrical manner with respect to the center longitudinal axis of the vehicle, and therefore in the region of the right end of the bumper 2. The supports 8 are configured and attached in the same way.

The trim panel 3 is mounted in the respective support 8 below the bumper 2. The end plate 4 in the region of the left end of the bumper 2 is mounted exclusively in the trim panel 3, and therefore is not mounted in the end pipes 5. The support 8 that is assigned to the opening 7 in the trim panel 3 is arranged adjacent to the opening 7. The end plate 4 is mounted in the trim panel 3 by fasteners in an upper region and a lower region. The end plate 4 is connected to the trim panel 3 at the top by a single screw fastener 9 and at the bottom by two screw fasteners 10 to achieve stable mounting of the end plate 4 in the region of the opening 7 of the trim panel 3 adjacent to the support 8 that is assigned to the opening 7.

Each support 8 has a Z-shaped profile transversely with respect to the support longitudinal direction, which is the Z-direction of the vehicle. Each support 8 is mounted in the bumper 2 to be adjusted vertically. Specifically, the support 8 has a U-shaped upper end with first and second limbs 11, 12 arranged on opposite sides of the bumper 2. The first limb 11 is screwed in the region of a vertically arranged slit 13, and the second limb 12 is screwed in the region of a vertically arranged slot 14. The slit 13 makes pivoting in of the support 8 about the Y-axis possible during the mounting of the support 8 on the bumper 2. Blind rivet threaded bolts 15 penetrate the slit 13 and the slot 14 and are connected to the support 8. The limbs 11, 12 of the support 8 are fixed between nuts (not shown), which are screwed onto the blind rivet threaded bolts 15, and the bumper 2, with prior orientation of the support 8 to the bumper 2 in the Z-direction of the vehicle.

A further blind rivet threaded bolt 16 is connected to a lower end of each support 8. The blind rivet threaded bolts 16 fasten a plate-shaped heat shield 17 with regard to an exhaust gas system muffler that is arranged in front of the heat shield 17 in the immediate vicinity thereof, in relation to the forward driving direction of the vehicle.

A sheet metal nut 20 is plugged onto the lower end of the support 8 in the driving direction (xy-plane). The sheet metal nuts 20 function to screw on the trim panel 3 to achieve a stable mounting of the trim panel 3 in the two supports 8 and the bumper 2 in the X-direction of the vehicle due to the relatively great lever arm of the support 8.

Additionally, the two supports 8 have attachments 18 that are directed toward one another to support a foam part (not illustrated) between the attachments 18 and the trim panel 3. The interaction of the foam part between the arrangement of the bumper 2 and the supports 8 and the trim panel 3, enables particularly favorable deformation results to be achieved in an impact test at a relatively low impact speed.

LIST OF DESIGNATIONS

1 Vehicle rear
2 Bumper
3 Trim panel
4 End plate
5 End pipe
6 Flange hub
7 Opening
8 Support
9 Screw fastener 10 Screw fastener
11 Limb
12 Limb
13 Slit
14 Slot
15 Blind rivet threaded bolt
16 Blind rivet threaded bolt
17 Heat shield
18 Attachment
19 Opening
20 Sheet metal nut

What is claimed is:

1. A vehicle rear of a motor vehicle, comprising a bumper configured as a beam and arranged in a transverse direction of the motor vehicle; a trim panel covering the bumper and an opening penetrating the trim panel below the bumper; an end plate for at least one end pipe of an exhaust gas system of the motor vehicle, the end plate penetrating the opening; and first and second supports connected to the bumper behind the trim panel, the supports extending down from the bumper, the trim panel being mounted in the supports below the bumper, and the end plate being mounted in the trim panel.

2. The vehicle rear of claim 1, wherein the first and second supports are provided respectively at opposite first and second end regions of the bumper.

3. The vehicle rear of claim 1, wherein at least the first support is positioned adjacent the opening of the trim panel.

4. The vehicle rear of claim 1, wherein the end plate is configured as a double pipe end plate.

5. The vehicle rear of claim 1, wherein the trim panel completely encloses an end plate plane of the end plate.

6. The vehicle rear of claim 1, further comprising fasteners that mount the end plate in the trim panel.

7. The vehicle rear of claim 1, wherein upper and lower regions of the end plate are mounted in the trim panel.

8. The vehicle rear of claim 7, wherein the end plate is mounted in the trim panel at the top by a single fastener and at the bottom by two fasteners.

9. The vehicle rear of claim 1, wherein each support has a Z-shaped profile transversely with respect to a support longitudinal direction.

10. The vehicle rear of claim 1, each support is mounted vertically adjustably in the bumper.

11. The vehicle rear of claim 10, wherein each support has a U-shaped upper end with limbs arranged on both sides of the bumper, the limbs of the support being screwed to the bumper in the region of a vertically arranged slit or slot that penetrates the respective limb.

12. The vehicle rear of claim 11, further comprising blind rivet threaded bolts connected to each support and penetrating a slit in the one limb and a slot in the other limb, and nuts which being screwed onto the blind rivet threaded bolts to fix the limbs between the nuts and the bumper.

13. The vehicle rear of claim 1, further comprising a sheet metal nut plugged onto a lower part of each support and in a region where the support is connected to the trim panel.

14. The vehicle rear of claim 1, wherein each support has attachments on sides that face one another for supporting a foam part between the attachments and the trim panel.

15. The vehicle rear of claim 1, further comprising a heat shield arranged with the supports for shielding heat of an exhaust gas system muffler arranged behind the trim panel.

* * * * *